G. H. HESS.
APPARATUS FOR TREATING TO AN IMPREGNATING FLUID, PARTICLES OF NON-UNIFORM MOISTURE CONTENT.
APPLICATION FILED MAY 17, 1917.

1,265,330.

Patented May 7, 1918.
5 SHEETS—SHEET 1.

G. H. HESS.
APPARATUS FOR TREATING TO AN IMPREGNATING FLUID, PARTICLES OF NON-UNIFORM MOISTURE CONTENT.
APPLICATION FILED MAY 17, 1917.

1,265,330.

Patented May 7, 1918.
5 SHEETS—SHEET 4.

Witnesses:
Inventor:
George H. Hess,

UNITED STATES PATENT OFFICE.

GEORGE H. HESS, OF LA GRANGE PARK, ILLINOIS.

APPARATUS FOR TREATING TO AN IMPREGNATING FLUID, PARTICLES OF NON-UNIFORM MOISTURE CONTENT.

1,265,330.　　　　Specification of Letters Patent.　　Patented May 7, 1918.

Application filed May 17, 1917. Serial No. 169,266.

*To all whom it may concern:*

Be it known that I, GEORGE H. HESS, a citizen of the United States, residing at La Grange Park, in the county of Cook and State of Illinois, have invented a new and useful Improvement in Apparatus for Treating to an Impregnating Fluid, Particles of Non-Uniform Moisture Content, of which the following is a specification.

My invention relates to apparatus to be used in treating to an impregnating fluid, in general, particles of non-uniform moisture-content, and more particularly to apparatus for manufacturing paper pulp from wood fiber, though it may be used in the treatment of other materials to fluids other than those employed in the manufacture of wood pulp as commonly practised.

It may be stated briefly as a preface to the following description, that where the particles to be treated are of non-uniform moisture-content, the product resulting from the impregnating fluid treatment is rendered imperfect or non-uniform in as much as the action of the fluid varies with the degree of moisture in the particles treated thereby. This disadvantage is especially marked in the case of the manufacture of wood pulp from wood chips, which in practice are chipped from logs, which are usually water-soaked at their outer surfaces, the practice heretofore followed requiring the removal from the mass of chips treated to the digesting fluid, of those chips (which in practice represented a relatively large proportion of the mass) which have been under-treated.

My primary object is to provide apparatus of the general character above stated whereby particles of non-uniform moisture-content which are to be treated to an impregnating fluid, may be caused to be uniformly treated to such fluid in a commercial, practical and economical manner, to produce a uniform and substantially perfect product, and more particularly as regards the use of the invention in the manufacture of paper pulp, to produce with the maximum economy, a substantially perfect product.

Referring to the accompanying drawings;

Figure 1 is a view in elevation, and partly in the nature of a diagram, of an apparatus constructed in accordance with my invention, this apparatus as well as all of the others shown in the drawings being designed for use more particularly in the manufacture of wood pulp.

Fig. 2 is a view like Fig. 1 of the digester element thereof and adjacent parts, this view being partly sectional.

Fig. 3ª is a view in sectional elevation and partly broken away, showing a desirable construction of racks for the drier portion of the apparatus.

The apparatus shown in Figs. 1 to 4 inclusive involves a drier represented at 10 into which the particles to be dried, as for example the wood chips, are introduced and through which they pass and during such passage are subjected to drying currents of air; a bin or receptacle 11 wherein the equalizing of the moisture in the particles, takes place, this bin being in communication with the discharge of the drier 10; a charging bin 12 located above the bin 11 and adapted to receive from the latter, as through the medium of the blower apparatus shown at 11ª, the particles, the moisture-content of which is equalized in the bin 11; and a digester 13 which is supplied with charges of the particles, from the storage bin 12, a valve 12ª being located between the bin 12 and digester 13 and the latter having an outlet valve 13ª.

Figures 1, 2, 3A:
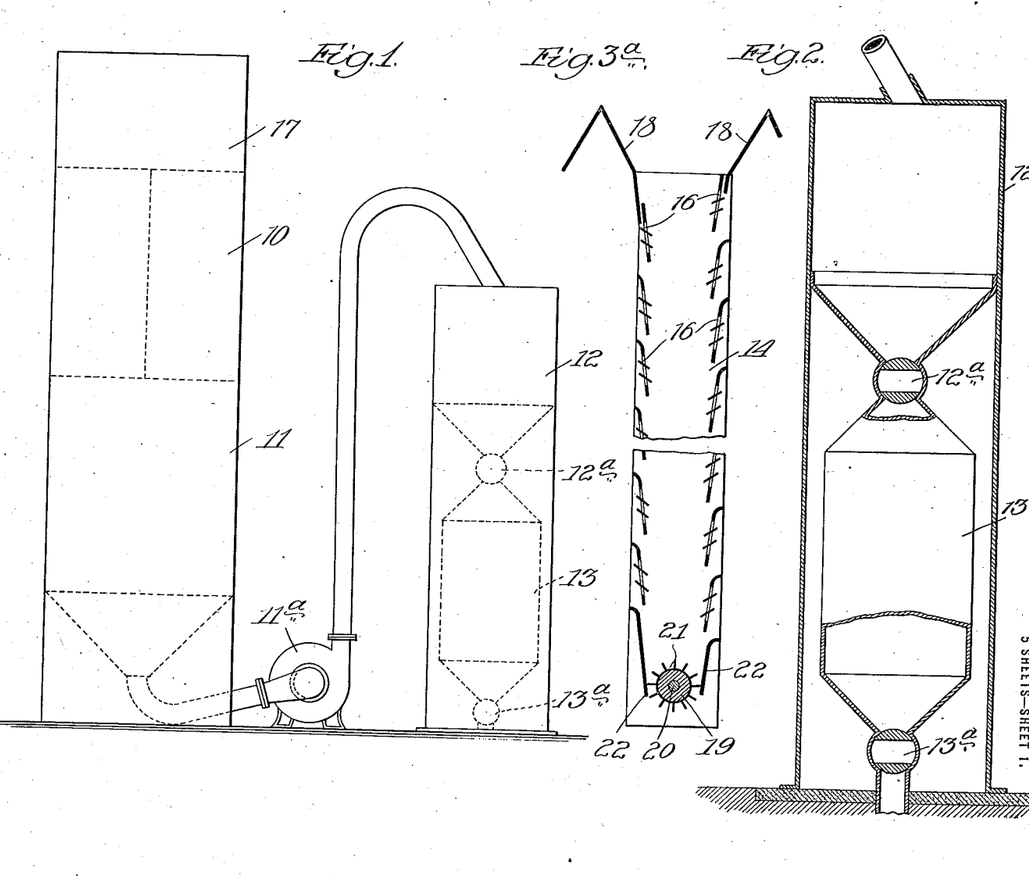
Figures 3, 4, 5:
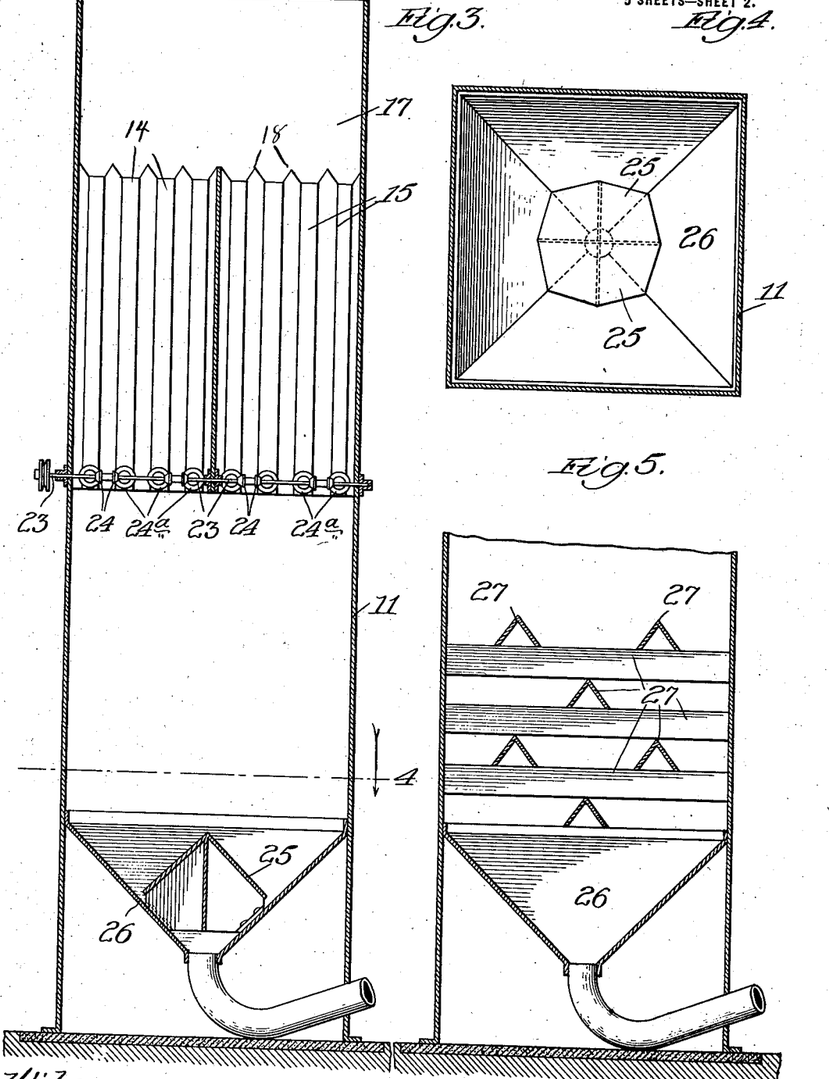
Fig. 3 is a view like Fig. 1 but more in detail, showing certain of the parts of the structure in section.
Fig. 4 is a section taken at the line 4 on Fig. 3 and viewed in the direction of the arrow.
Fig. 5 is a view in vertical sectional elevation of a modification of the bin or receptacle into which the drier discharges.

The type of drier 10 represented in the drawings is that involving a plurality of uprightly disposed racks 14, the end walls of which are represented at 15 in Fig. 3, these racks extending parallel with each other and having opposed walls open to the passage therethrough of the drying medium, as for example heated air, in accordance with the practice which is common to drying apparatus in general, the said opposed walls of the racks through which the air passes to perform the drying function, being preferably formed of upright series of louvered plates 16 which are so arranged that the plates 16 of one series converge relative to the plates 16 of the opposite series thereof, with the plates spaced apart vertically, as illustrated of the rack in Fig. 3ª. The upper ends of the racks 14 open into a garner, or bin, 17 the bottom of which is formed of a series of angle-shaped plates 18 which are spaced apart and close the bin 17, except to the upper ends of the racks 14, this bin being provided to receive the particles to be dried. The racks 14 contain in their lower portions, feeding devices, represented at 19, these feeding devices being mounted on shafts 20 journaled in the opposite end walls of the racks 14. The feed devices 19 are provided about their peripheries with a series of pockets 21 formed between longitudinally-extending teeth thereon, coöperating with plates 22 to cause the discharge from the racks to be controlled by the rotation of the devices 19, these devices being driven from a shaft 23 carrying bevel pinions 24 which mesh with bevel gears 24ª on the shafts 20.

The bin 11 is of such construction that in the drawing off of particles therefrom at its lower end to charge the digester 13, the mass of particles will descend therein substantially uniformly, or in other words, all of the particles discharged from this bin will be those which went into the bin first, as distinguished from the commingling of the particles which entered the bin at times relatively remote to each other, this being effected in the construction shown in Fig. 3 by the substantially pyramid-shaped deflector 25 coöperating with the central pyramid-shaped discharge portion 26 of the bin 11, to which portion said deflector is secured to be spaced therefrom and provide a continuous space between the lower edges of the deflector 25 and the adjacent surfaces of the walls of the portion 26 as shown.

In constructing an apparatus of this general character it is necessary that it be so constructed that the particles to be subjected to the moisture-equalizing process, be permitted to remain in contact with each other prior to the impregnating fluid treatment, as for example in a digester, for a length of time sufficient to produce the desired equalization of the moisture therein, the length of time required for this manifestly varying with the character of the particles to be treated and the moisture content thereof. Furthermore, the amount of particles drawn from the equalizing portion of the apparatus for treatment and the frequency with which the apparatus is thus drawn on for material, are elements which enter into the determination of the proportion of the apparatus for any particular conditions. For purposes of illustration let it be assumed that it requires 8 hours to digest a charge of wood fiber in the digester 13, and thus requiring three separate charges of particles per day for the continuous operation of the digester, and that the material which is treated in the digester is wood fiber and the particular wood fiber employed requires approximately 16 hours to effect moisture equalization for all practical purposes; the bin 11 would preferably be of such proportions that its capacity would be substantially equal to three times the capacity of the digester 13 and the drier 10 would be of such proportions and so operated that it would insure, by reason of the output of the drier for any given time, the particles remaining in the bin 11 for at least 16 hours. If the drier were a continuously operating element, it would preferably have a capacity for 24 hours of substantially three times that of the digester, under the conditions above stated, but if the drier were of greater capacity it would be operated intermittently to refill the bin 11 after the equalized particles are drawn therefrom.

In the operation of the apparatus as the charges are dumped from the digester, with an interval of 8 hours between each discharge, and the digester replenished with raw material which preferably is effected through the bin 12 and valve 12ª, so as to accomplish the rapid charging of the digester, the mass of particles in the bin 11 descends therein uniformly in replenishing the supply in the charging bin 12, and in the course of the movement of the particles from the drier 10 to the digester those which later enter as a charge into the digester, are caused to remain in close contact with each other for a length of time sufficient to effect the uniform distribution of the moisture in the particles throughout the mass thereof, the fact that the particles are discharged from the drier in a heated condition, and in such condition are caused to lie in contact with each other causing the dissemination of the moisture throughout the mass to be more quickly effected.

It may be stated that while the apparatus should be so constructed that the particles to be subjected to the fluid-impregnating treatment, should remain in contact with each other for a sufficient length of time to produce the desired degree of moisture equalization, and while from a commercial standpoint and under ordinary conditions it probably would be more economical to cause the particles to contact with each other only for such a length of time as is required to produce the desired moisture equalization, the apparatus may be so constructed or so operated that the particles may remain in juxtaposed position and in contact with each other for a length of time greater than that required to produce the desired degree of moisture equalization, without effecting any harmful results.

Referring to the structure shown in Fig. 5, this figure is intended to show a slight modification of the bin 11. In this case the means which provide for the uniform lowering of the material in the bin 11 throughout its cross-sectional area as the particles are withdrawn from the opening in its bottom portion 26, instead of being provided of the form shown in Fig. 3, are composed of a plurality of vertical series of deflector plates 27, these plates being of inverted trough form as illustrated. Each alternate series 27 extend at right angles to the series thereof above and below, the deflectors of alternate series extending in the same direction, being staggered as represented, the effect of thus providing the deflectors 27 being that of causing the particles to descend substantially uniformly through the bin 11 when the particles in the lower portion of the bin are discharged, as distinguished from the particles at the upper portion of the mass pouring down through the center of the mass.

Figures 6, 7:
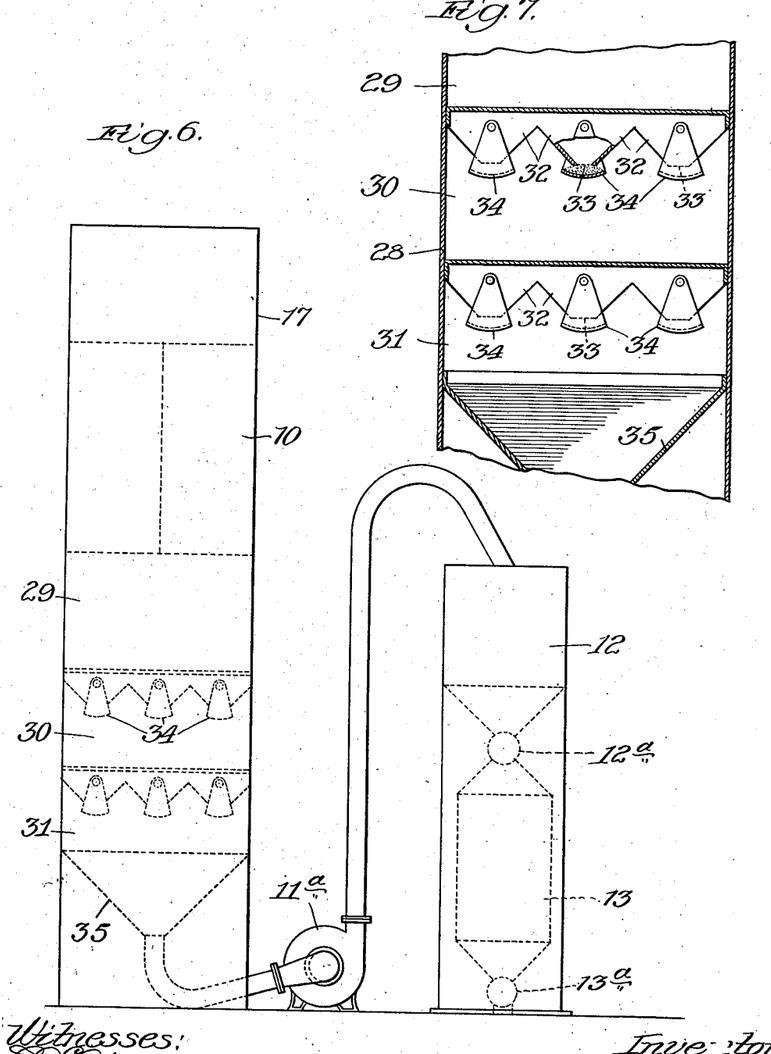
Fig. 6 is a view like Fig. 1, of another embodiment of my invention.
Fig. 7 is a broken view like Fig. 5 taken in a vertical plane in Fig. 6 midway between opposed walls of the receptacle which is superposed by the drier.

The arrangement shown in Fig. 6 is the same as that disclosed in Figs. 1 to 4 inclusive except as to the equalizing bin, which in the constructions shown in Figs. 6 and 7 is represented at 28. This bin receives the dried particles from the superposed drier 10 as in the case of the previously described structure, but instead of being formed as an open structure, is provided with three separate compartments 29, 30 and 31, which in the case of the illustration given in connection with the description of the structure shown in Fig. 1, would each hold an amount of material substantially equal to the capacity of the digester 13. The bottoms of the compartments 29 and 30 are hopper-shaped as indicated at 32 in Fig. 7, the discharge portions 33 of these hoppers being controlled by pivotally supported valves 34 which, in the position of the parts shown in Fig. 7 prevent the flow of material through them, these valves being connected with any suitable operating mechanism (not shown) for shifting them into and out of closed position. The bottom of the compartment 31 is of hopper shape as illustrated at 35 and opens into the blower apparatus 11ª.

In the operation of the apparatus of Figs. 6 and 7, the valves 34 coöperating with the bottoms of the compartments 29 and 30 are alternately operated, after withdrawing the particles from the compartment 31, to lower the particles in the compartment 30 into the compartment 31 and the particles in the compartment 29 into the compartment 30, the effect of this operation being to insure the uniform passage of the particles through the bin 28 so that each particle will remain therein substantially for the same length of time as every other particle to produce the moisture equalization desired.

Figure 8:
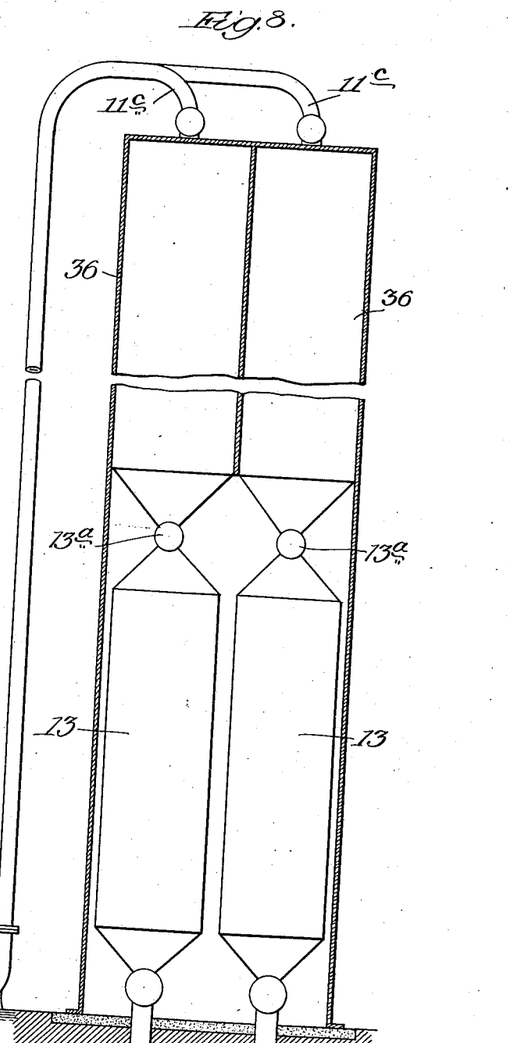
Fig. 8 is a view like Fig. 1 of another form in which my invention may be provided.
Figure 9:
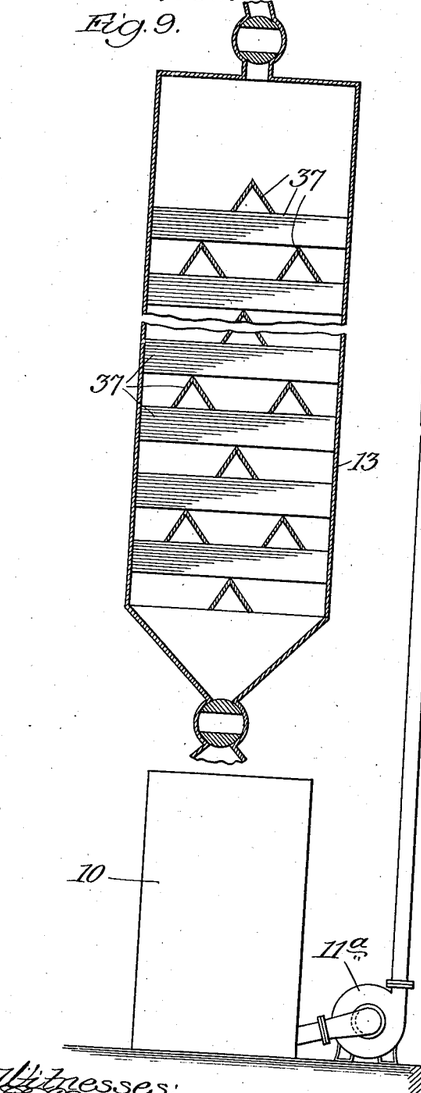
Fig. 9 is an enlarged view in vertical sectional elevation of one of the similar equalizing receptacles of the structure shown in Fig. 8.

The apparatus shown in Figs. 8 and 9 differs from that hereinbefore described primarily in the fact that the equalizing bins instead of being located below the drier 10, are located directly above the digesters which are to be fed therefrom. In the case of this apparatus the drier represented at 10 is connected with the blower mechanism 11ª which, when the drier is a continuously discharging structure, operates continuously to force the dried and heated particles from the drier 10 upwardly through the pipe 11ᵇ from which they discharge through the branches 11ᶜ thereof into the upper inlet ends of the equalizing bins, indicated in these figures at 36, these equalizing bins being provided in duplicate and each superposed on and opening into a digester 13 located below it, with valves 13ª controlling the discharge of the particles from the bins 36 into the digesters.

The bins 36 which are so constructed in any suitable way, as by the vertical series of inverted trough-shaped cross-pieces 37 as explained of the construction in Fig. 5, to insure the uniform lowering of the particles in these bins during the drawing off of particles therefrom at their lower ends, should be so proportioned that in the operation of the apparatus the particles to be treated in the digesters 13 will remain in the bins 36 a sufficient length of time to effect the equalization of the moisture therein to the desired degree. The comments herein made as to the various conditions affecting this matter of equalization, apply to the apparatus now being explained and it will therefore be sufficient to say that, assuming the particular case upon the basis of which the structure of Figs. 1 to 4, inclusive, was described, the bins 36 should each be of substantially three times the capacity of the digester, which is charged therefrom, and the drier 10 should be of such capacity that it will supply the dried particles to the bins 36 in such amounts as to insure all of the particles discharged from the bins 36 into digesters 13, being in contact with each other for the length of time necessary to produce the desired moisture equalization namely in the particular example illustrated 16 hours.

Figure 10:
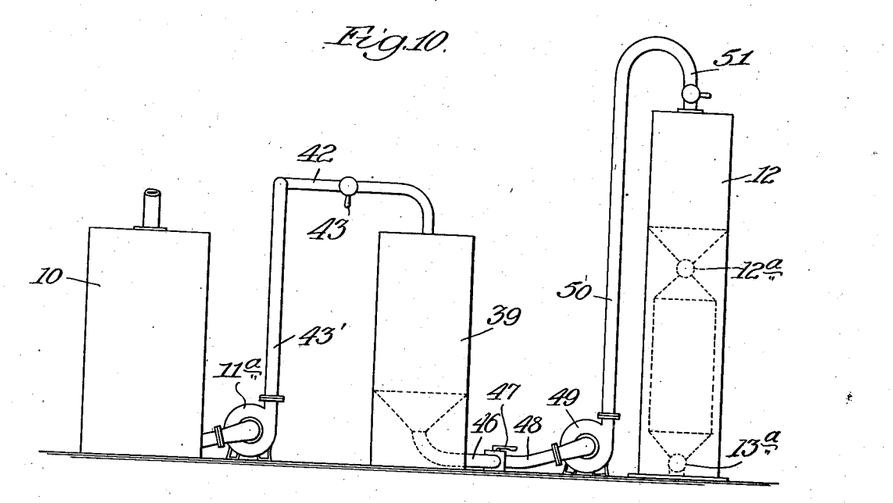
Fig. 10 is a view similar to Fig 1 of still another embodiment of my invention.
Figure 11:
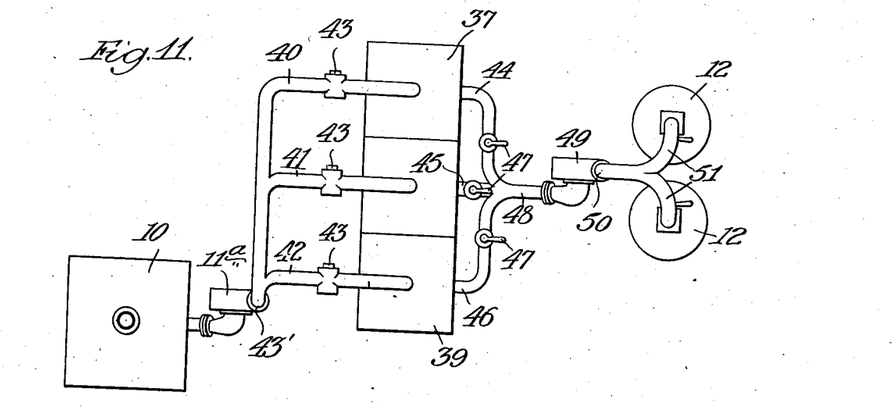
Fig. 11, a plan view of the structure shown in Fig. 10.

In the construction illustrated in Figs. 10 and 11, a battery of equalizing bins is provided, these bins being drawn upon successively to furnish the charges of particles to the digesters which are shown as two in number, instead of providing a single bin and drawing a portion of the contents of this bin each time the digesters are to be charged.

In this arrangement the equalizing bins are represented at 37, 38 and 39, these bins being connected at their upper ends through the medium of branch pipes 40, 41 and 42 with a pipe 43' opening into the blower 11$^a$ which connects with the discharge portion of the drier 10, the branches 40, 41 and 42 having valves 43 therein. The lower discharges ends of the bins 37, 38 and 39 connect with branch pipes 44, 45 and 46 respectively, these pipes containing valves 47 and uniting with a pipe 48 connected with a blower 49, the outlet end of which is connected with a pipe 50 which is provided at its upper end with branches 51 opening into the upper ends of receiving bins 12 like the bin 12 of Fig. 1, these bins being located over the digesters 13 and discharging into the latter respectively through the valved portions 12$^a$. It will be understood from the foregoing that the course of the particles is through the drier 10, thence by the suction means 11$^a$ into the equalizing bin section of the apparatus, thence to the receiving bins 12 under the action of the blower 49, and then into the digesters 13.

In accordance with the general arrangement shown in these figures, the idea is to cause the particles after leaving the drier 10 to remain in the respective bins 37, 38 and 39 for such a length of time as will insure the effecting of the desired degree of moisture equalization before the particles pass into the digesters 13. This arrangement is laid out upon the assumptions given by way of example in connection with the description of the construction shown in Figs. 1 to 4 inclusive, namely that it requires about 8 hours to digest a charge of wood fiber in the digesters, that it requires approximately 16 hours to effect moisture equalization for all practical purposes and that the apparatus is in continuous operation, and upon these assumptions by way of example, each of the bins 37, 38 and 39 would have substantially the same capacity as the two digesters 13 combined, or in other words a charge from any one of the said bins would be sufficient to charge both digesters, though it will be understood that if desired, but one digester may be employed in which case the capacity of each of said equalizing bins would be reduced substantially one-half, or a battery of more digesters may be employed in which case the capacity of the equalizing bins would be correspondingly increased.

In the operation of the apparatus, the particles as they are discharged from the drier 10 are, by manipulating the valves 43, introduced into one of the equalizing bins which supplied the charge then being operated on in the digesters 13, and as the bins 37, 38 and 39 are successively emptied of their contents to charge the digesters 13, the valves 43 are manipulated to fill these bins as they become empty. It will thus be understood that upon the particular basis of operation and assumption of conditions as above stated, all of the particles in any one of the bins 37, 38 and 39 will remain therein for at least 16 hours, some of them remaining longer as will be manifest, this being sufficient to equalize the moisture-content to the desired degree.

It will be noted that in the constructions shown in Figs. 1 to 7, inclusive, the drier is mounted above the equalizing bin, so that the drier discharges directly into the bin without carrying the dried particles through a conduit of such length that the particles become relatively cooled in their passage to the equalizing bin.

This is desirable inasmuch as the equalizing step is performed more rapidly where the particles remain in contact with each other under heat than if the particles of materials enter the equalizer bin in relatively cool condition.

It will be understood from the foregoing that in all of the forms of apparatus shown and described, provision is made for causing the particles of material and which are of non-uniform moisture content, to remain in contact with each other a sufficient length of time to cause the moisture in the particles to be substantially equalized, before the particles are presented for further treatment, as for example in the digesters, and while I have shown and described certain particular forms in which my invention may be embodied, it will be readily understood that the same may be variously modified and altered, and the invention be provided in other forms, without departing from the spirit of my invention.

Furthermore, while I have described my improved apparatus for use in the manufacture of wood pulp, I do not wish to be understood as intending to limit the invention to apparatus provided for such use, as it may be incorporated in apparatus where it is desired that impregnating fluids, other than those required for digesting wood fiber, be employed.

What I claim as new and desire to secure by Letters Patent is:

1. In apparatus for the purpose set forth, the combination of means for partially drying to a non-uniform moisture-content, pieces of material of non-uniform moisture-content, means for substantially equalizing the moisture-content of said partially dried pieces, and means for treating the particles of substantially uniform moisture-content to an impregnating fluid, said second-named means being constructed and arranged to furnish charges of the said pieces of substantially uniform moisture-content to said last-named means for the substantially uninterrupted successive operations of the latter.

2. In apparatus for the purpose set forth, the combination of means for subjecting pieces of material of non-uniform moisture-content to heat for partially drying the pieces to non-uniform moisture-content, means for receiving the pieces in heated condition and substantially equalizing the moisture-content of said partially dried pieces, and means for treating the pieces of substantially uniform moisture-content to an impregnating fluid, said second-named means being constructed and arranged to furnish charges of the said pieces of substantially uniform moisture-content to said last named means for the substantially uninterrupted successive operations of the latter.

3. In apparatus for the purpose set forth, the combination of means for partially drying to a non-uniform moisture-content, pieces of material of non-uniform moisture-content, a receptacle for receiving the partially dried pieces, and means for treating the pieces of substantially uniform moisture-content after passing through said receptacle, to an impregnating fluid, said receptacle containing an outlet in its lower end and being so constructed and arranged that the pieces discharge therefrom substantially in the order of their introduction into the said receptacle and serving to maintain the partially dried pieces in contact with each other for a length of time sufficient to effect substantially uniform dissemination of the moisture through the said pieces before passing to said last-named-means.

4. In apparatus for the purpose set forth, the combination of means for substantially equalizing the moisture-content of pieces of material of non-uniform moisture-content, a receptacle for receiving the pieces after passing through, and becoming equalized in, said first-named receptacle, and means located below said receptacle for receiving the equalized pieces and treating them to an impregnating fluid, said receptacle having a capacity sufficient to hold a charge for said means and serving to maintain a charge of the said pieces in position above said means for quick discharge into the latter to recharge said means.

5. In apparatus for the purpose set forth, the combination of a receptacle for receiving pieces of material of non-uniform moisture-content, said receptacle containing an outlet in its lower end and being so constructed and arranged that the pieces discharge therefrom substantially in the order of their introduction into the said receptacle and serving to maintain the pieces in contact with each other for a length of time sufficient to effect substantially uniform dissemination of the moisture through the pieces before discharging therefrom, a receptacle for receiving the pieces after passing through said first-named receptacle, and means located below said second-named receptacle for receiving the equalized pieces and treating them to an impregnating fluid, said second-named receptacle having a capacity sufficient to hold a charge for said means and serving to maintain a charge of the pieces in position above said means for quick discharge into the latter to recharge said means.

6. In apparatus for the purpose set forth, the combination of means for partially drying to a non-uniform moisture-content, pieces of material of non-uniform moisture-content, means for substantially equalizing the moisture-content of the partially dried pieces, a receptacle for receiving the pieces after passing through, and becoming equalized in, said first-named receptacle, and means located below said receptacle for receiving the equalized pieces and treating them to an impregnating fluid, said receptacle having a capacity sufficient to hold a charge for said means and serving to maintain a charge of the said pieces in position above said means for quick discharge into the latter to recharge said means.

7. In apparatus for the purpose set forth, the combination of means for partially drying to a non-uniform moisture-content, pieces of material of non-uniform moisture-content, means for substantially equalizing the moisture-content of said partially dried pieces, and means located below, and closely adjacent to, the discharge of said drying means and into which the pieces dried in said drying means discharge directly and while in heated condition, and means for treating the pieces of substantially uniform moisture-content, to an impregnating fluid.

8. In apparatus for the purpose set forth, the combination of means for partially drying to a non-uniform moisture-content, pieces of material of non-uniform moisture-content, means for substantially equalizing the moisture-content of said partially dried pieces, and means located below, and closely adjacent to, the discharge of said drying means and into which the pieces dried in said drying means discharge directly and while in heated condition, and means for treating the pieces of substantially uniform moisture-content, to an impregnating fluid, said second-named means being constructed and arranged to furnish charges of said pieces of substantially uniform moisture-content to said last-named means for the substantially uninterrupted successive operations of the latter.

9. In apparatus for producing wood pulp from particles of wood fiber of non-uniform moisture-content, the combination of means for partially drying to a non-uniform moisture-content, the pieces of wood fiber, means for substantially equalizing the moisture-content of said partially dried pieces, and means for reducing the mass of said particles of substantially uniform moisture-content to pulp condition suitable for the manufacture of paper, said second-named means being constructed and arranged to furnish charges of pieces of substantially uniform moisture-content to said last-named means for the substantially uninterrupted successive operations of the latter.

10. In apparatus for producing wood pulp from pieces of wood fiber of non-uniform moisture-content, the combination of means for subjecting the pieces to heat for partially drying them to a non-uniform moisture-content, means for receiving said pieces in heated condition and substantially equalizing the moisture-content of said partially dried pieces, and means for reducing the mass of said pieces of substantially uniform moisture-content to pulp condition suitable for the manufacture of paper, said second-named means being constructed and arranged to supply charges of pieces of substantially uniform moisture-content to said last-named means for the substantially uninterrupted successive operations of the latter.

11. In apparatus for producing wood pulp from pieces of wood fiber of non-uniform moisture-content, the combination of means for partially drying to a non-uniform moisture-content, the pieces of wood fiber, a receptacle into which the partially dried pieces are introduced, to extend into contact with each other for substantially equalizing the moisture-content of said partially dried pieces, and means for reducing the mass of said pieces of substantially uniform moisture-content to pulp condition suitable for the manufacture of paper, said second-named means being constructed and arranged to supply charges of pieces of substantially uniform moisture-content to said last-named means for the substantially uninterrupted successive operations of the latter.

GEORGE H. HESS.